UNITED STATES PATENT OFFICE.

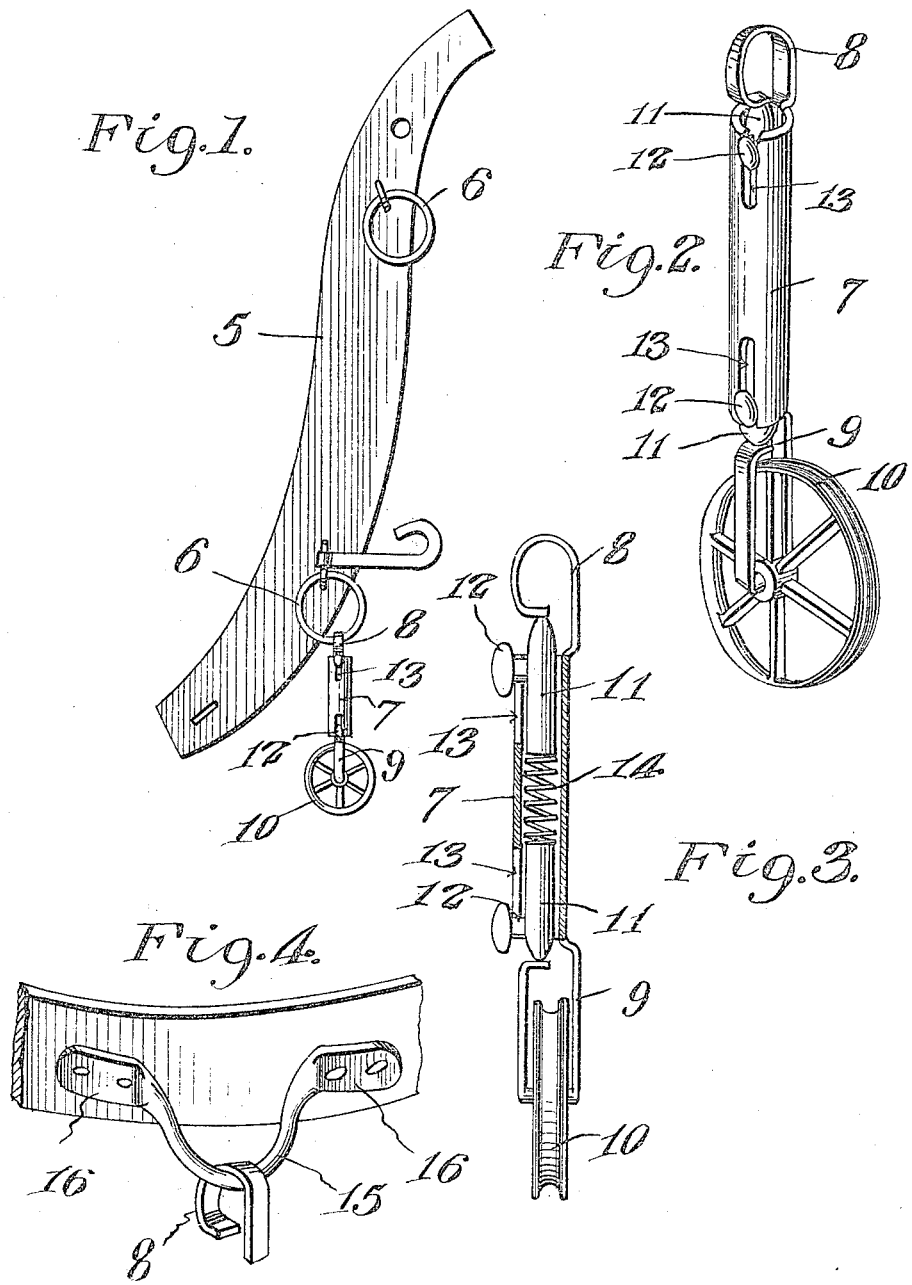

THOMAS JEFFERSON SPILLERS, OF BUTLER, GEORGIA.

PLOW-LINE HOLDER.

951,854.      Specification of Letters Patent.      Patented Mar. 15, 1910.

Application filed November 30, 1909. Serial No. 530,623.

*To all whom it may concern:*

Be it known that I, THOMAS J. SPILLERS, a citizen of the United States, residing at Butler, in the county of Taylor and State of Georgia, have invented certain new and useful Improvements in Plow-Line Holders, of which the following is a specification, reference being had to the accompanying drawings.

This invention relates to certain new and useful improvements in plow line holders and has for its object to provide a very simple device which is attachable to the hames or harness of the draft animal to support the driving lines and prevent wear of the same by constant rubbing on the traces.

Another object of the invention is to provide a tubular casing having spring pressed bolts longitudinally movable therein, the outer end of one of said bolts engaging with a hook adapted to be passed through one of the hame rings or through a suitable eye secured to the harness, said casing having an extension formed integrally therewith adapted to rotatably support a grooved wheel below the casing, said extension being engaged by the other of said bolts to retain the lines upon said wheel.

With these and other objects in view, the invention consists of the novel construction, combination and arrangement of parts hereinafter fully described and claimed, and illustrated in the accompanying drawings, in which—

Figure 1 is a side elevation of a hame showing my improved line holder attached thereto; Fig. 2 is a detail perspective view of the holder; Fig. 3 is a longitudinal section thereof; and Fig. 4 is a detail perspective view of an eye adapted to be secured to the harness.

Referring to the drawings 5 indicates the hame which may be of any approved construction and has pivoted thereto one or more rings 6.

My improved holder is adapted to be attached to the ring 6 and comprises a cylindrical tubular body or casing 7 which is formed upon its upper end with a hook 8. A depending arm 9 is also formed upon the lower end of the casing 7 and is laterally disposed to provide a bearing portion for the grooved wheel 10. The outer end of the arm 9 is vertically disposed and has its extremity extended inwardly. Thus a substantially U-shaped yoke frame is formed, the casing 7 being disposed upon one side of the transverse center of the wheel.

A sliding bolt 11 is disposed in each end of the tubular casing 7 and is formed with a stud 12 which projects through an open ended slot 13 whereby the bolts may be moved longitudinally in the casing. The bolts are normally held with their outer ends in engagement with the hook 8 and the inwardly turned extremity of the arm 9 by means of a coiled spring 14. This spring is arranged within the casing 7 between the inner ends of the bolts, and either one of said bolts may be operated to withdraw the end of the same from engagement with the hook or arm to release the holder from the hame ring or the line from the wheel 10.

In operation the bolt 11 disposed in the lower end of the casing 7 is drawn inwardly and the driving line is positioned in the groove of the wheel 10. Upon the release of the bolt the end of the same will engage with the extremity of the arm 9 and retain the line in position. The hook 8 may be engaged with the hame ring in the manner of an ordinary snap hook, the bolt 11 being forced inwardly by the engagement of the same with the ring. Thus the holder will depend from the hame ring and will move therein in accordance with the exertions of the animal and at all times support the line without occasioning any strain upon the various parts.

The holder may also be attached to the traces or the back band of the harness, and for this purpose I provide a substantially U-shaped eye 15 which is formed with the laterally extending flattened ends 16 riveted or otherwise secured to the trace or back band. The hook 8 may be readily engaged with the eye 15 to suspend the holder from the harness.

By means of my improved holder the driving lines will be supported out of contact with the traces and the wear thereon which is incident to the constant rubbing and friction will be entirely eliminated thus materially lengthening the period of usefulness of the lines.

While I have shown and described what I believe to be the preferred embodiment of the invention it will be obvious that various minor changes in the form, proportion and details of construction may be resorted to without departing from the spirit or sacrificing any of the advantages of the invention.

Having thus described the invention, what is claimed is:

1. A device of the character described comprising a tubular casing, a sliding bolt disposed in each end of said casing, a hook formed on one end of the casing adapted to be engaged by one of said bolts to close the same, a downwardly extending arm formed on said casing, a wheel rotatably mounted on said arm, the other of said bolts being normally engaged with the extremity of said arm, substantially as and for the purpose set forth.

2. A device of the character described comprising a cylindrical tubular casing, a spring pressed bolt slidably mounted in each end of said casing, a hook integrally formed on the upper end of said casing normally engaged by one of said bolts to close the same, an arm depending from said casing having a laterally extending portion, a grooved wheel rotatably mounted on said lateral extension, the extremity of said arm extending upwardly and inwardly, the other of said bolts being normally held in yielding engagement therewith.

3. A device of the character described comprising a tubular cylindrical casing, a bolt slidably mounted in each end of said casing, a spiral spring disposed within said casing between the inner ends of the bolts, a hook formed on the upper end of said casing, one of said bolts being held in yielding engagement therewith to close the same, an arm depending from the lower end of said casing having a laterally extending portion, a grooved wheel rotatably mounted thereon, said casing being disposed out of alinement with the groove of the wheel, the end of said arm being upwardly and inwardly disposed, the other of said bolts having yielding engagement therewith, and means secured to the harness adapted to receive said hook to suspend the device in operative position, substantially as and for the purpose set forth.

In testimony whereof I hereunto affix my signature in the presence of two witnesses.

THOMAS JEFFERSON SPILLERS.

Witnesses:
C. M. LUCAS,
L. G. LUCAS.